July 1, 1924. 1,500,031
J. PHILLIPS
AUXILIARY AIR INTAKE FOR INTERNAL COMBUSTION ENGINES
Filed Oct. 18, 1921

WITNESSES
Oliver W. Holmes
A. L. Ketchin

INVENTOR
JACK P. HILLIPS
BY
ATTORNEYS

Patented July 1, 1924.

1,500,031

UNITED STATES PATENT OFFICE.

JACK PHILLIPS, OF NEW YORK, N. Y.

AUXILIARY AIR INTAKE FOR INTERNAL-COMBUSTION ENGINES.

Application filed October 18, 1921. Serial No. 508,450.

*To all whom it may concern:*

Be it known that I, JACK PHILLIPS, a citizen of the United States, and a resident of the city of New York, borough of Manhattan, in the county and State of New York, have invented a new and Improved Auxiliary Air Intake for Internal-Combustion Engines, of which the following is a full, clear, and exact description.

This invention relates to internal combustion engines and particularly to an air intake therefor and has for an object to provide an improved construction of air intake which may be manually controlled at any time and which may be positioned at a point distant from the engine.

Another object in view is to provide an auxiliary air intake for internal combustion engines which has its controlling members arranged on or near the dashboard of an automobile when used in connection with the engine of the automobile whereby the driver may vary the intake at pleasure.

Another object is to provide an auxiliary air intake for automobile engines in which a pipe or tube extends from the intake manifold of the engine to a point near the driver where a manual controlled valve is provided formed with means for automatically taking in a small supply of air and secondary means for taking in a large supply of air, the secondary means being manually controlled.

In the accompanying drawing—

Figure 1:
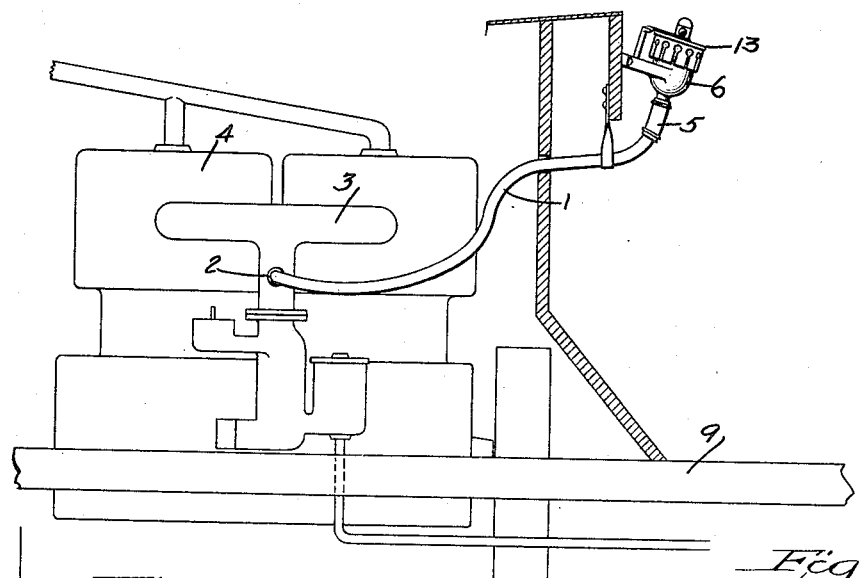
Figure 1 is a fragmentary sectional view through part of an automobile showing an embodiment of the invention applied thereto and to the engine carried by the automobile.
Figure 3:
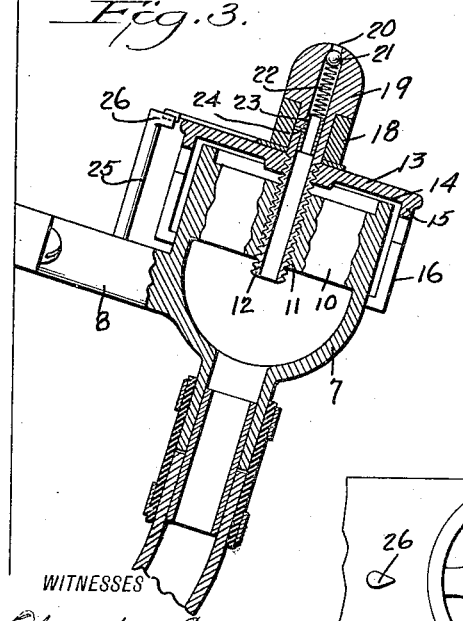
Figure 3 is a sectional view through Figure 2 approximately on line 3—3.
Figure 2:
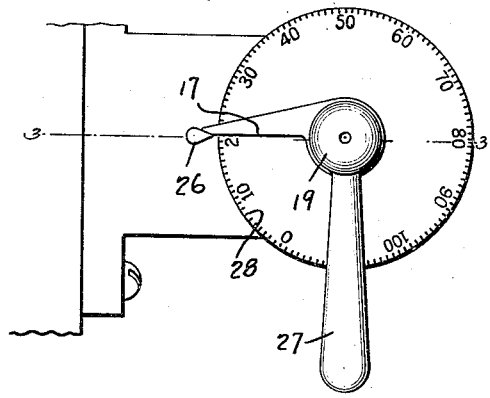
Figure 2 is an enlarged top plan view of the auxiliary intake valve shown in Figure 1.
Figure 4:
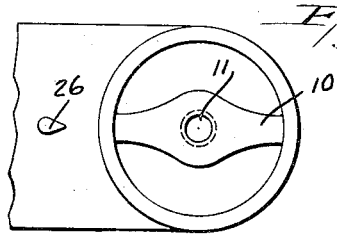
Figure 4 is a top plan view of the structure shown in Figure 3 with the cap removed.

In automobile engines some form of carburetor is used together with an air intake therefor, said air intake forming part of the carburetor. The gasoline and the air intake are both adjusted to cause the carburetor to act in a proper manner and to give a desired mixture under varying conditions. In adjusting the carburetor, care must be taken to adjust the air intake thereof so that the engine will rotate slowly and will also operate at a high speed. To cause the engine to function at different speeds, the air intake is adjusted to give as good a mixture as possible, both at low and high speeds. However, it will be evident that at some speeds there is too rich a mixture but this cannot be prevented when using only an ordinary intake forming part of the carburetor.

To obviate this condition and to provide a substantially perfect mixture at all times an auxiliary intake of a supply structure is provided. This intake is formed with a pipe 1 connected at 2 to the intake manifold 3 of the engine 4. A flexible coupling 5 connects the pipe 1 with what may be termed a hand controlled valve 6 for controlling the intake of air through pipe 1. The valve 6 is provided with a bowl 7 formed with a bracket 8 whereby it may be secured readily to the instrument board of the automobile 9. The bowl 7 is provided with a spider 10 having a threaded central bore 11 adapted to accommodate a threaded sleeve or tubular member 12. This tubular member is provided with a cap 13 rigidly secured thereto by being threaded thereon. The cap 13 is provided with an imperforate or solid top 14 having a solid turned down edge 15 merging into a slitted flange 16. The edge 15 and flange 16 are preferably spaced a short distance from the bowl 7 so that when the cap 13 is rotated for unscrewing the pipe 12 an opening will be formed so that the air may pass through the slitted flange 16 over the upper edge of the bowl 7 and from thence downwardly into the bowl and into the pipe 1. A pointer 17 is provided with a large end having an aperture through which the pipe 12 extends, said pointer being clamped in place by the sleeve 18, which in turn is pressed against the pointer by the head 19 preferably formed integral with the pipe 12. When the head 19 is screwed down tight so that the sleeve 18 will press tightly against the pointer 17, said pointer will be locked in position.

To adjust the position of the pointer 17, head 19 and associated parts will be loosened and the pointer moved to the desired place and the parts again tightened. The head 19 is provided with a small entrance bore 20 normally closed by a ball 21 pressed by spring 22, which spring is held in place by a tubular stop 23 which in turn is held in the pipe 12 by a pin 24. Extending upwardly from the bracket 8 is a standard 25 having a combined pointer and stop 26 adapted to strike the pointer 17 and prevent any further movement thereof. The sleeve 18 is preferably provided with a handle 27 so that when the parts are tightly clamped together, handle 27 may be moved around in a circle to rotate the cap 13 to any desired position.

When the device is in use, it is desirable to first set the valve 6 to suit the particular engine used. In order to do this, the cap 13 is moved until it tightly presses against the upper edge of the bowl 7 and the zero on the graduated scales 28 is opposite the pointer 26. After the engine has been warmed up and is travelling at a moderate speed, handle 27 is gradually moved for rotating cap 13 so as to admit more and more auxiliary air. This movement is continued until the engine begins to knock whereupon it is moved back slowly until the knocking stops. This indicates that the engine is getting a proper supply of air so as to cause a substantially perfect combustion. The operator then observes the particular graduation opposite the pointer 26 and then loosens head 19 and associated parts and moves the pointer 17 over to the graduation thus noted. The head 19 and associated parts are then screwed down tight and left permanently in that position so that the next time auxiliary air is desired, it will only be necessary to move the lever 27 over until the pointer 17 strikes pointer 26.

What I claim is:—

1. An auxiliary intake for internal combustion engines comprising a cup, a tubular member for connecting said cup with the intake manifold of said engine, said cup having a spider therein formed with a threaded bore, an externally threaded pipe screwed into said bore, said pipe having a clamping head, a spring pressed ball acting as a valve arranged in said pipe whereby the pipe acts as an automatic intake for a small quantity of air, a cap connected with said pipe and rotatable therewith whereby when the pipe is rotated the cap will be rotated and move toward or from the bowl so as to admit more or less air, and a pair of stops associated with said cap and with the bowl for limiting the rotation of said cap, one of said stops being adjustable.

2. An auxiliary air intake for internal combustion engines comprising a bowl, a valve positioned to admit air into said bowl automatically by a rarefaction in said bowl, a tubular member for connecting the bowl with the intake manifold of the engine, a cap fitted over said bowl, a threaded member threaded into a part of said bowl carrying said cap so that when the threaded member is rotated the cap will be moved toward and from the bowl, an adjustable rotatable pointer carried by said cap, said pointer being clamped in any adjusted position in respect to said cap by said threaded member, and a stationary stop co-acting with the pointer for limiting the rotation of the cap and the threaded member.

3. An auxiliary air intake for internal combustion engines comprising an air chamber connected with the intake manifold of said engine, said air chamber being open to the atmosphere at one end and formed with a cross piece within the chamber, said cross piece having a threaded bore, the cover for said air chamber adapted to tightly engage the chamber and close the open end thereof, a threaded stem connected with said cover and screwed into said threaded bore, said stem being hollow, and a spring pressed valve arranged in said bore, said valve being adapted to be unseated by a rarefaction in said chamber.

4. In a gas engine, the combination with an intake manifold and a carburetor connected therewith, of an auxiliary air valve connected with said manifold comprising a chamber, a tube connecting said chamber and said intake manifold, a valve cap fitted onto said chamber, a valve stem screwed into said chamber, a handle connected with said stem to rotate the same and said valve cap, an indicator having a portion thereof interposed between said valve cap and handle, and spring-actuated means for admitting air into said chamber through said stem independent of said valve cap when the rarification within said chamber reaches a certain degree.

5. The combination with a gas engine, of an air regulator comprising a chamber having one end open to the atmosphere and the other end open and connected to the intake manifold of said engine, a support within said chamber, a valve stem screwed within said support and projecting into the chamber, a valve cap adapted to cover and tightly seat itself upon the open end of the chamber, said cap being screwed to the upper portion of said valve stem; the exterior face of said valve cap being provided with graduations indicating the degree of aperture of the same, a handle encircling the stem above the valve cap, an indicating finger interposed between the valve cap and the handle adjacent to the indications on the valve, said stem being provided with a bore extending its entire length, a spring located within said opening, and a valve pressed by said spring and closing the atmospheric end of said bore, said valve being adapted to be actuated by the engine suction.

6. In combination with an internal combustion engine, a cup presenting an open end adapted to act as a seat for a tightly fitting cover, a cover for said cup, a valve stem threaded at one end presenting a longitudinal bore, a tube secured within said longitudinal bore intermediate the ends thereof, a valve closing one end of said bore and a spring interposed between said valve and said tube to normally hold said valve closed, a support for said stem, a handle lying adjacent the upper face of said cover adapted to rotate the same, an indicating finger interposed between said handle and said cover, adapted to indicate the amount of aperture of said cover with respect to said chamber, and means adjacent said cover acting as a stop for said indicating finger.

7. In combination with an internal combustion engine, a cup presenting an open end adapted to act as a seat for a tightly fitting cover, a cover for said cup, a valve stem threaded at one end presenting a longitudinal bore, a spring pressed valve closing one end of said bore, a support for said stem, a handle operatively connected with said cover and adapted to rotate the same, an indicating finger arranged above said cover and adapted to indicate the amount of aperture of said cover with respect to said chamber, and means adjacent said cover acting as a stop for said indicating finger.

JACK PHILLIPS.